United States Patent
Maddux et al.

(10) Patent No.: US 10,456,006 B2
(45) Date of Patent: Oct. 29, 2019

(54) RACK MOUNTING FEATURES FOR A DISHWASHER APPLIANCE

(71) Applicant: Haier US Appliance Solutions, Inc., Wilmington, DE (US)

(72) Inventors: Benjamin Carl Maddux, Louisville, KY (US); Jeffrey Thomas Kiesler, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 15/697,507

(22) Filed: Sep. 7, 2017

(65) Prior Publication Data
US 2019/0069753 A1   Mar. 7, 2019

(51) Int. Cl.
| | |
|---|---|
| A47L 15/42 | (2006.01) |
| A47L 15/14 | (2006.01) |
| A47L 15/24 | (2006.01) |
| A47L 15/50 | (2006.01) |
| B29L 31/00 | (2006.01) |

(52) U.S. Cl.
CPC .......... *A47L 15/14* (2013.01); *A47L 15/241* (2013.01); *A47L 15/501* (2013.01); *A47L 15/507* (2013.01); *B29L 2031/762* (2013.01)

(58) Field of Classification Search
CPC ........ A47L 15/14; A47L 15/241; A47L 15/50; A47L 15/501; A47L 15/507; A47L 15/42; A47B 2088/401; A47B 88/423

USPC ........................ 312/228, 228.1, 334.1, 334.7
See application file for complete search history.

(56) References Cited

U.S. PATENT DOCUMENTS

| | | | |
|---|---|---|---|
| 4,765,697 A | 8/1988 | Gardell et al. | |
| 5,226,706 A | 7/1993 | Tuller | |
| 5,549,760 A | 8/1996 | Becker | |
| 5,671,986 A * | 9/1997 | Vinet | A47L 15/507 312/311 |
| 6,390,518 B1 | 5/2002 | Elick | |
| 7,014,281 B2 | 3/2006 | Wuestefeld et al. | |
| 9,579,010 B2 | 2/2017 | Shewmaker | |
| 10,004,381 B1 * | 6/2018 | Maddux | A47L 15/507 |
| 10,034,597 B1 * | 7/2018 | Maddux | A47L 15/507 |
| 2008/0067905 A1 | 3/2008 | Guiles | |
| 2015/0190033 A1 | 7/2015 | Shaffer et al. | |

* cited by examiner

*Primary Examiner* — James O Hansen
(74) *Attorney, Agent, or Firm* — Dority & Manning, P.A.

(57) ABSTRACT

A rack mounting assembly for supporting an upper rack assembly within a tub of a dishwasher appliance is provided. The tub defines an alignment feature and a screw hole. The rack mounting assembly includes a mounting body defining a mounting boss and a complementary feature configured for engaging the alignment feature of the tub when the mounting body is properly aligned. When the mounting body is properly aligned, the mounting boss is substantially aligned with a screw hole in the tub such that a screw can pass through the mounting boss and into the screw hole to secure the mounting body to the tub.

19 Claims, 12 Drawing Sheets

RACK MOUNTING FEATURES FOR A DISHWASHER APPLIANCE

FIELD OF THE INVENTION

The present disclosure relates generally to dishwasher appliances, and more particularly to improved rack mounting features for dishwasher appliances.

BACKGROUND OF THE INVENTION

Dishwasher appliances generally include a tub that defines a wash chamber. Rack assemblies can be mounted within the wash chamber of the tub for receipt of articles for washing. Multiple spray assemblies can be positioned within the wash chamber for applying or directing wash fluid towards articles disposed within the rack assemblies in order to clean such articles. Dishwasher appliances are also typically equipped with at least one pump for circulating fluid through the multiple spray assemblies. In addition, devices referred to as diverters may be used to control the flow of fluid received from the pump.

In addition to conventional lower and middle rack assemblies, certain dishwasher appliances include a "third rack" or "upper rack" positioned above the lower and middle rack assemblies, e.g., for receiving flatware, cutlery, or other cooking utensils. For both conventional and upper rack assemblies, properly supporting such rack assemblies within the tub of the dishwasher appliance requires the installation of a mounting bracket or assembly. However, installing such mounting brackets is often complicated, requiring multiple parts and increasing the potential for misalignment or improper mounting. Moreover, mounting brackets are conventionally mounted by punching one or more holes through the tub and passing a screw from outside of the tub to the inside for mounting the mounting bracket. However, such an installation method increases the potential for leaks, particularly in plastic tubs which are typically not as rigid as stainless steel tubs.

Accordingly, a dishwasher appliance that utilizes improved rack mounting features would be useful. More specifically, a rack mounting assembly that enables a simple, leak-free mounting of an upper rack assembly would be particularly beneficial.

BRIEF DESCRIPTION OF THE INVENTION

The present subject matter provides a rack mounting assembly for supporting an upper rack assembly within a tub of a dishwasher appliance. The tub defines an alignment feature and a screw hole. The rack mounting assembly includes a mounting body defining a mounting boss and a complementary feature configured for engaging the alignment feature of the tub when the mounting body is properly aligned. When the mounting body is properly aligned, the mounting boss is substantially aligned with a screw hole in the tub such that a screw can pass through the mounting boss and into the screw hole to secure the mounting body to the tub. Additional aspects and advantages of the invention will be set forth in part in the following description, may be apparent from the description, or may be learned through practice of the invention.

In accordance with one exemplary embodiment of the present disclosure, a dishwasher appliance defining a vertical, a lateral, and a transverse direction is provided. The dishwasher appliance includes a tub including a top wall and a side wall that partially define a wash chamber for receipt of articles for washing, the tub further defining an alignment feature and a screw hole that only penetrates through a portion of the tub so that no holes are defined through the tub. An upper rack assembly is slidably positioned within the wash chamber and is configured for movement along the transverse direction. A rack mounting assembly is provided for supporting the upper rack assembly, the rack mounting assembly including a mounting body defining a mounting hole. A complementary feature engages the alignment feature of the tub, the mounting hole being substantially aligned with the screw hole when the complementary feature engages the alignment feature of the tub. A screw passes through the mounting hole and into the screw hole to secure the mounting body to the tub.

In accordance with another exemplary embodiment of the present disclosure, a rack mounting assembly for supporting an upper rack assembly within a tub of a dishwasher appliance is provided. The tub includes a top wall and a side wall partially defining a wash chamber for receipt of articles for washing, the tub further defining an alignment feature and a screw hole that only penetrates through a portion of the tub so that no holes are defined through the tub. The rack mounting assembly includes a mounting body defining a mounting hole and a complementary feature configured for engaging the alignment feature of the tub, the mounting hole being substantially aligned with the screw hole when the complementary feature engages the alignment feature of the tub. A screw passes through the mounting hole and into the screw hole to secure the mounting body to the tub.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
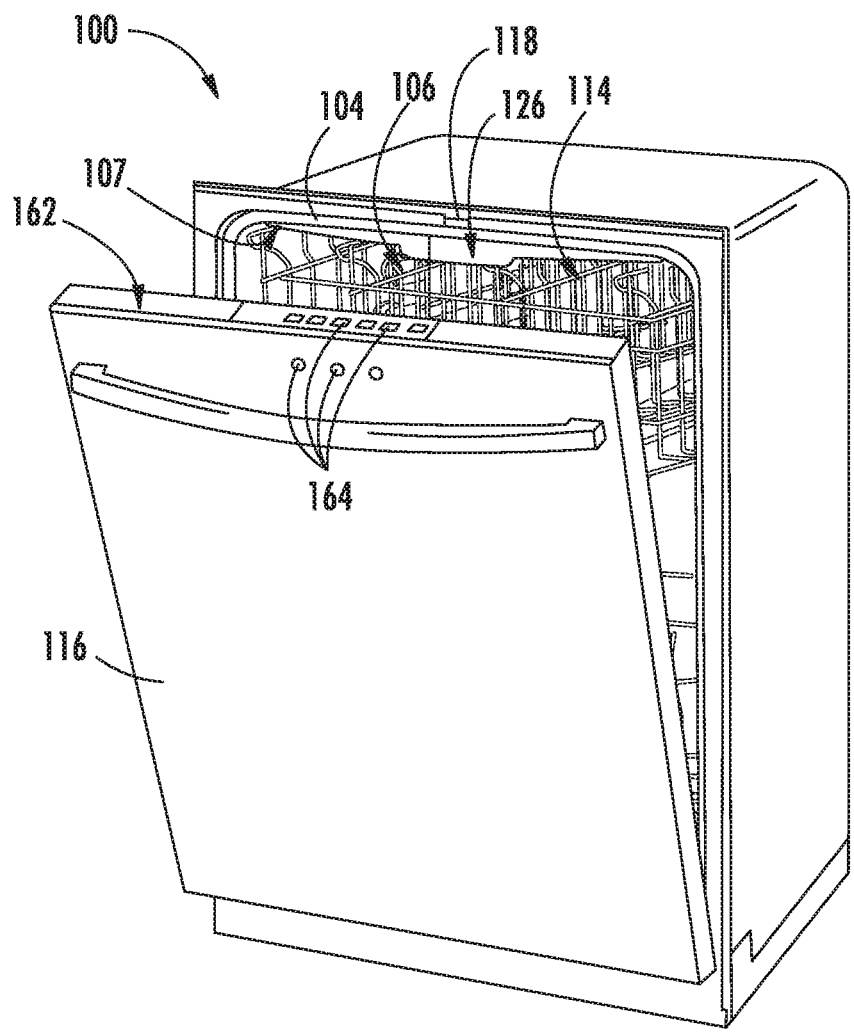
FIG. 1 provides a perspective view of an exemplary embodiment of a dishwashing appliance of the present disclosure with a door in a partially open position.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "article" may refer to, but need not be limited to dishes, pots, pans, silverware, and other cooking utensils and items that can be cleaned in a dishwashing appliance. The term "wash cycle" is intended to refer to one or more periods of time during which a dishwashing appliance operates while containing the articles to be washed and uses a detergent and water, preferably with agitation, to e.g., remove soil particles including food and other undesirable elements from the articles. The term "rinse cycle" is intended to refer to one or more periods of time during which the dishwashing appliance operates to remove residual soil, detergents, and other undesirable elements that were retained by the articles after completion of the wash cycle. The term "drain cycle" is intended to refer to one or more periods of time during which the dishwashing appliance operates to discharge soiled water from the dishwashing appliance. The term "wash fluid" refers to a liquid used for washing and/or rinsing the articles and is typically made up of water that may include other additives such as detergent or other treatments. Furthermore, as used herein, terms of approximation, such as "approximately," "substantially," or "about," refer to being within a ten percent margin of error.

Figure 2:
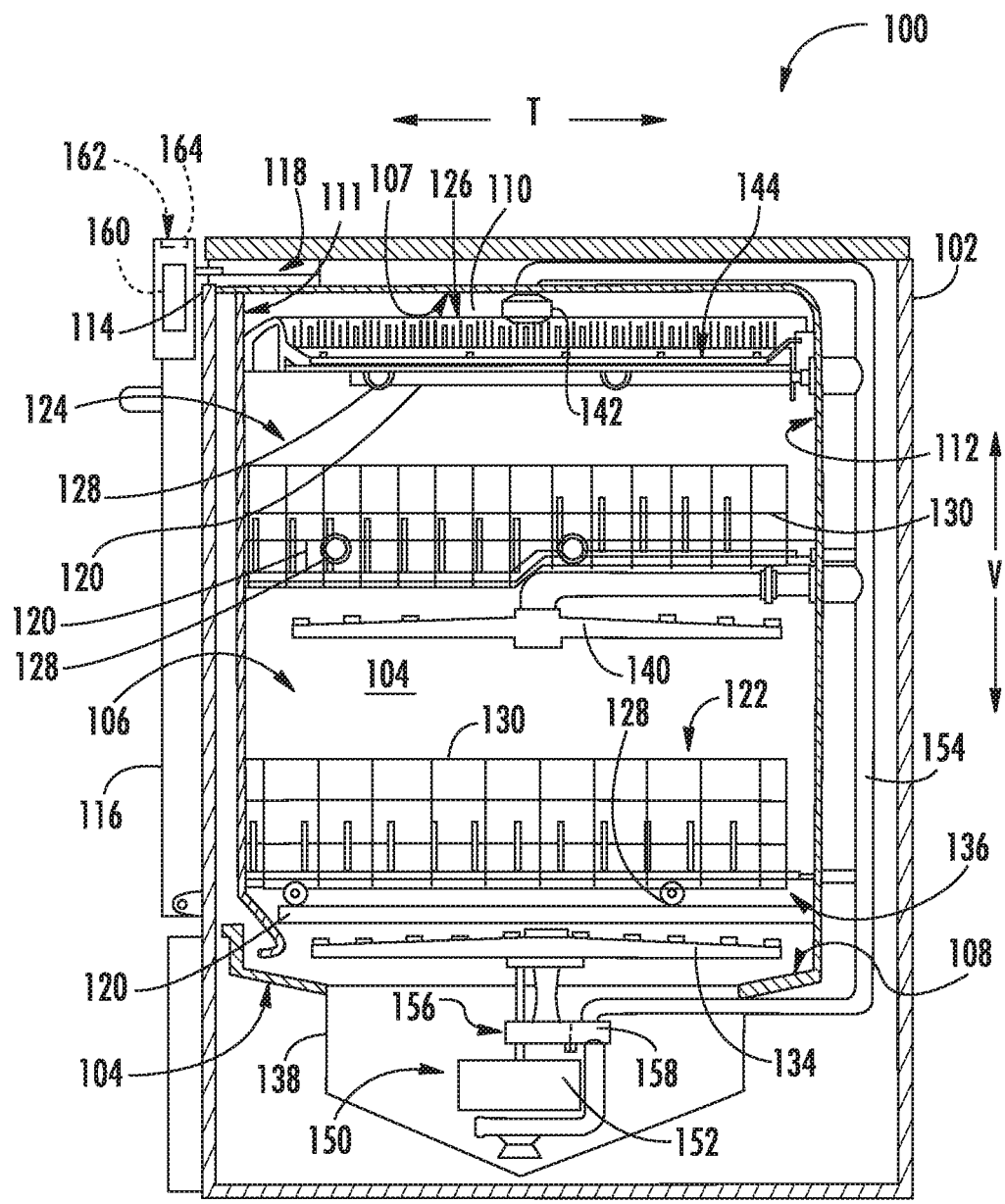
FIG. 2 provides a side, cross sectional view of the exemplary dishwashing appliance of FIG. 1.

FIGS. 1 and 2 depict an exemplary domestic dishwasher or dishwashing appliance 100 that may be configured in accordance with aspects of the present disclosure. For the particular embodiment of FIGS. 1 and 2, the dishwasher 100 includes a cabinet 102 (FIG. 2) having a tub 104 therein that defines a wash chamber 106. As shown in FIG. 2, tub 104 extends between a top 107 and a bottom 108 along a vertical direction V, between a pair of side walls 110 along a lateral direction L, and between a front side 111 and a rear side 112 along a transverse direction T. Each of the vertical direction V, lateral direction L, and transverse direction T are mutually perpendicular to one another.

The tub 104 includes a front opening 114 and a door 116 hinged at its bottom for movement between a normally closed vertical position (shown in FIG. 2), wherein the wash chamber 106 is sealed shut for washing operation, and a horizontal open position for loading and unloading of articles from the dishwasher 100. According to exemplary embodiments, dishwasher 100 further includes a door closure mechanism or assembly 118 that is used to lock and unlock door 116 for accessing and sealing wash chamber 106.

As best illustrated in FIG. 2, tub side walls 110 accommodate a plurality of rack assemblies. More specifically, guide rails 120 may be mounted to side walls 110 for supporting a lower rack assembly 122, a middle rack assembly 124, and an upper rack assembly 126. As illustrated, upper rack assembly 126 is positioned at a top portion of wash chamber 106 above middle rack assembly 124, which is positioned above lower rack assembly 122 along the vertical direction V. Each rack assembly 122, 124, 126 is adapted for movement between an extended loading position (not shown) in which the rack is substantially positioned outside the wash chamber 106, and a retracted position (shown in FIGS. 1 and 2) in which the rack is located inside the wash chamber 106. This is facilitated, for example, by rollers 128 mounted onto rack assemblies 122, 124, 126, respectively. Although a guide rails 120 and rollers 128 are illustrated herein as facilitating movement of the respective rack assemblies 122, 124, 126, it should be appreciated that any suitable sliding mechanism or member may be used according to alternative embodiments.

Some or all of the rack assemblies 122, 124, 126 are fabricated into lattice structures including a plurality of wires or elongated members 130 (for clarity of illustration, not all elongated members making up rack assemblies 122, 124, 126 are shown in FIG. 2). In this regard, rack assemblies 122, 124, 126 are generally configured for supporting articles within wash chamber 106 while allowing a flow of wash fluid to reach and impinge on those articles, e.g., during a cleaning or rinsing cycle. According to another exemplary embodiment, a silverware basket (not shown) may be removably attached to a rack assembly, e.g., lower rack assembly 122, for placement of silverware, utensils, and the like, that are otherwise too small to be accommodated by rack 122.

Dishwasher 100 further includes a plurality of spray assemblies for urging a flow of water or wash fluid onto the articles placed within wash chamber 106. More specifically, as illustrated in FIG. 2, dishwasher 100 includes a lower spray arm assembly 134 disposed in a lower region 136 of wash chamber 106 and above a sump 138 so as to rotate in relatively close proximity to lower rack assembly 122. Similarly, a mid-level spray arm assembly 140 is located in an upper region of wash chamber 106 and may be located below and in close proximity to middle rack assembly 124. In this regard, mid-level spray arm assembly 140 may generally be configured for urging a flow of wash fluid up through middle rack assembly 124 and upper rack assembly 126. Additionally, an upper spray assembly 142 may be located above upper rack assembly 126 along the vertical direction V. In this manner, upper spray assembly 142 may be configured for urging and/or cascading a flow of wash fluid downward over rack assemblies 122, 124, and 126. As further illustrated in FIG. 2, upper rack assembly 126 may further define an integral spray manifold 144, which is generally configured for urging a flow of wash fluid substantially upward along the vertical direction V through upper rack assembly 126.

The various spray assemblies and manifolds described herein may be part of a fluid distribution system or fluid circulation assembly 150 for circulating water and wash fluid in the tub 104. More specifically, fluid circulation assembly 150 includes a pump 152 for circulating water and wash fluid (e.g., detergent, water, and/or rinse aid) in the tub 104. Pump 152 may be located within sump 138 or within a machinery compartment located below sump 138 of tub 104, as generally recognized in the art. Fluid circulation assembly 150 may include one or more fluid conduits or circulation piping for directing water and/or wash fluid from pump 152 to the various spray assemblies and manifolds. For example, as illustrated in FIG. 2, a primary supply conduit 154 may extend from pump 152, along rear 112 of tub 104 along the vertical direction V to supply wash fluid throughout wash chamber 106.

As illustrated, primary supply conduit 154 is used to supply wash fluid to one or more spray assemblies, e.g., to mid-level spray arm assembly 140 and upper spray assembly 142. However, it should be appreciated that according to alternative embodiments, any other suitable plumbing configuration may be used to supply wash fluid throughout the various spray manifolds and assemblies described herein. For example, according to another exemplary embodiment, primary supply conduit 154 could be used to provide wash fluid to mid-level spray arm assembly 140 and a dedicated secondary supply conduit (not shown) could be utilized to provide wash fluid to upper spray assembly 142. Other plumbing configurations may be used for providing wash fluid to the various spray devices and manifolds at any location within dishwasher appliance 100.

Each spray arm assembly 134, 140, 142, integral spray manifold 144, or other spray device may include an arrangement of discharge ports or orifices for directing wash fluid received from pump 152 onto dishes or other articles located in wash chamber 106. The arrangement of the discharge ports, also referred to as jets, apertures, or orifices, may provide a rotational force by virtue of wash fluid flowing through the discharge ports. Alternatively, spray arm assemblies 134, 140, 142 may be motor-driven, or may operate using any other suitable drive mechanism. Spray manifolds and assemblies may also be stationary. The resultant movement of the spray arm assemblies 134, 140, 142 and the spray from fixed manifolds provides coverage of dishes and other dishwasher contents with a washing spray. Other configurations of spray assemblies may be used as well. For example, dishwasher 100 may have additional spray assemblies for cleaning silverware, for scouring casserole dishes, for spraying pots and pans, for cleaning bottles, etc. One skilled in the art will appreciate that the embodiments discussed herein are used for the purpose of explanation only, and are not limitations of the present subject matter.

In operation, pump 152 draws wash fluid in from sump 138 and pumps it to a diverter assembly 156, e.g., which is positioned within sump 138 of dishwasher appliance.

Diverter assembly 156 may include a diverter disk (not shown) disposed within a diverter chamber 158 for selectively distributing the wash fluid to the spray arm assemblies 134, 140, 142 and/or other spray manifolds or devices. For example, the diverter disk may have a plurality of apertures that are configured to align with one or more outlet ports (not shown) at the top of diverter chamber 158. In this manner, the diverter disk may be selectively rotated to provide wash fluid to the desired spray device.

According to an exemplary embodiment, diverter assembly 156 is configured for selectively distributing the flow of wash fluid from pump 152 to various fluid supply conduits, only some of which are illustrated in FIG. 2 for clarity. More specifically, diverter assembly 156 may include four outlet ports (not shown) for supplying wash fluid to a first conduit for rotating lower spray arm assembly 134 in the clockwise direction, a second conduit for rotating lower spray arm assembly 134 in the counter-clockwise direction, a third conduit for spraying an auxiliary rack such as the silverware rack, and a fourth conduit for supply mid-level and/or upper spray assemblies 140, 142, i.e., such as primary supply conduit 154.

The dishwasher 100 is further equipped with a controller 160 to regulate operation of the dishwasher 100. The controller 160 may include one or more memory devices and one or more microprocessors, such as general or special purpose microprocessors operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 160 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 160 may be positioned in a variety of locations throughout dishwasher 100. In the illustrated embodiment, the controller 160 may be located within a control panel area 162 of door 116 as shown in FIGS. 1 and 2. In such an embodiment, input/output ("I/O") signals may be routed between the control system and various operational components of dishwasher 100 along wiring harnesses that may be routed through the bottom of door 116. Typically, the controller 160 includes a user interface panel/controls 164 through which a user may select various operational features and modes and monitor progress of the dishwasher 100. In one embodiment, the user interface 164 may represent a general purpose I/O ("GPIO") device or functional block. In one embodiment, the user interface 164 may include input components, such as one or more of a variety of electrical, mechanical or electro-mechanical input devices including rotary dials, push buttons, and touch pads. The user interface 164 may include a display component, such as a digital or analog display device designed to provide operational feedback to a user. The user interface 164 may be in communication with the controller 160 via one or more signal lines or shared communication busses.

It should be appreciated that the invention is not limited to any particular style, model, or configuration of dishwasher 100. The exemplary embodiment depicted in FIGS. 1 and 2 is for illustrative purposes only. For example, different locations may be provided for user interface 164, different configurations may be provided for rack assemblies 122, 124, 126, different spray arm assemblies 134, 140, 142 and spray manifold configurations may be used, and other differences may be applied while remaining within the scope of the present subject matter.

Referring now generally to FIGS. 3 through 13, a rack mounting assembly 200 will be described according to an exemplary embodiment of the present subject matter. According to the illustrated embodiment, dishwasher appliance 100 includes two rack mounting assemblies 200 positioned within wash chamber 106 and mounted to tub 104 for supporting upper rack assembly 126. However, it should be appreciated that aspects of the present subject matter may be used to support any suitable rack assembly in any suitable appliance. For example, mounting assemblies 200 or aspects thereof may be used to support lower rack assembly 122, middle rack assembly 124, or a rack of any other suitable appliance, such as a refrigerator or oven appliance.

Figure 3:
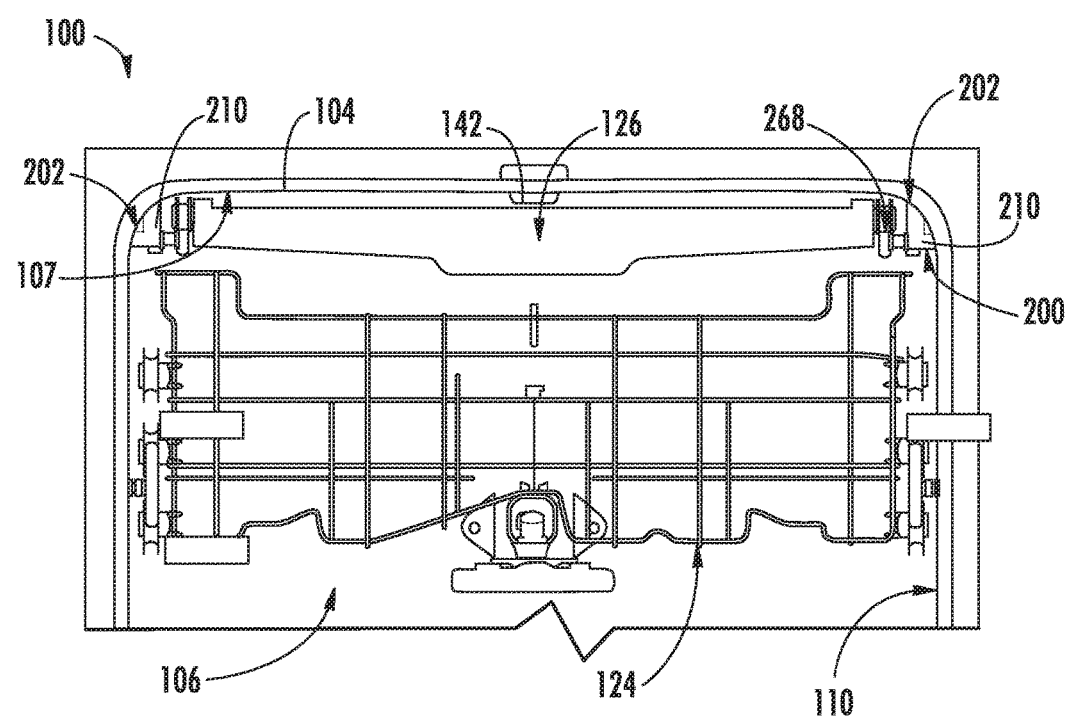
FIG. 3 provides a front view of an upper rack assembly of the exemplary dishwashing appliance of FIG. 1 according to an exemplary embodiment of the present subject matter.

As best illustrated in FIG. 3, dishwasher appliance 100 includes two rack mounting assemblies 200 positioned at the top corners of tub 104. More specifically, tub 104 defines radiused corners 202 where top wall 107 and the left and right side walls 110 meet. Radiused corners 202 are frequently used in dishwasher appliance tubs to simplify the molding process and improve the structural rigidity of tub 104. However, installing rack mounting assemblies 200 within such radiused corners 202 is often a difficult task. For example, space is limited within tub 104 and technicians often have to insert screws into blind holes.

According to exemplary embodiments of the present subject matter, tub 104 is injection-molded using any suitable plastic material. To facilitate simple removal of the molding tools used in the extrusion or molding process, side walls 110 of tub 104 may define a slight draft, i.e., side walls 110 do not extend perfectly along the transverse direction T. Radiused corners 202 and drafted side walls 110 can result in improperly aligned rack mounting assemblies 200 and in operational issues with upper rack assembly 126. Rack mounting assembly 200 rectifies many of these issues.

Figure 4:
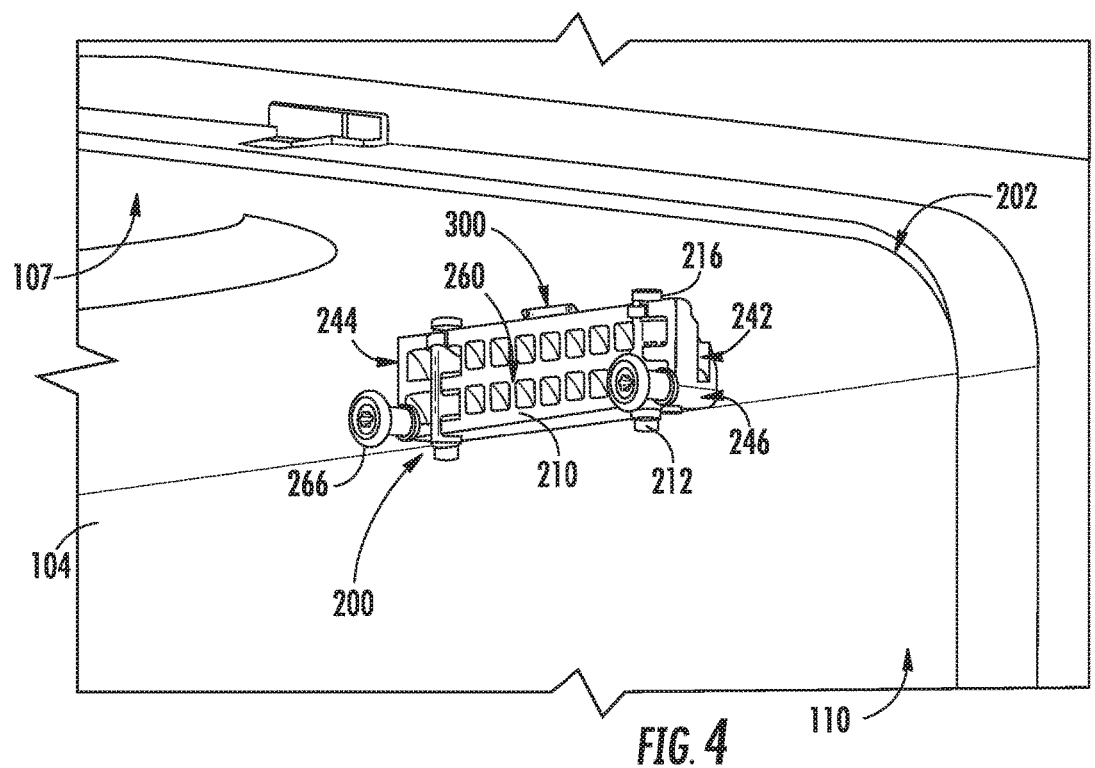
FIG. 4 provides a perspective view of a rack mounting assembly for mounting the exemplary upper rack assembly of FIG. 3 according to an example embodiment of the present subject matter.
Figure 5:
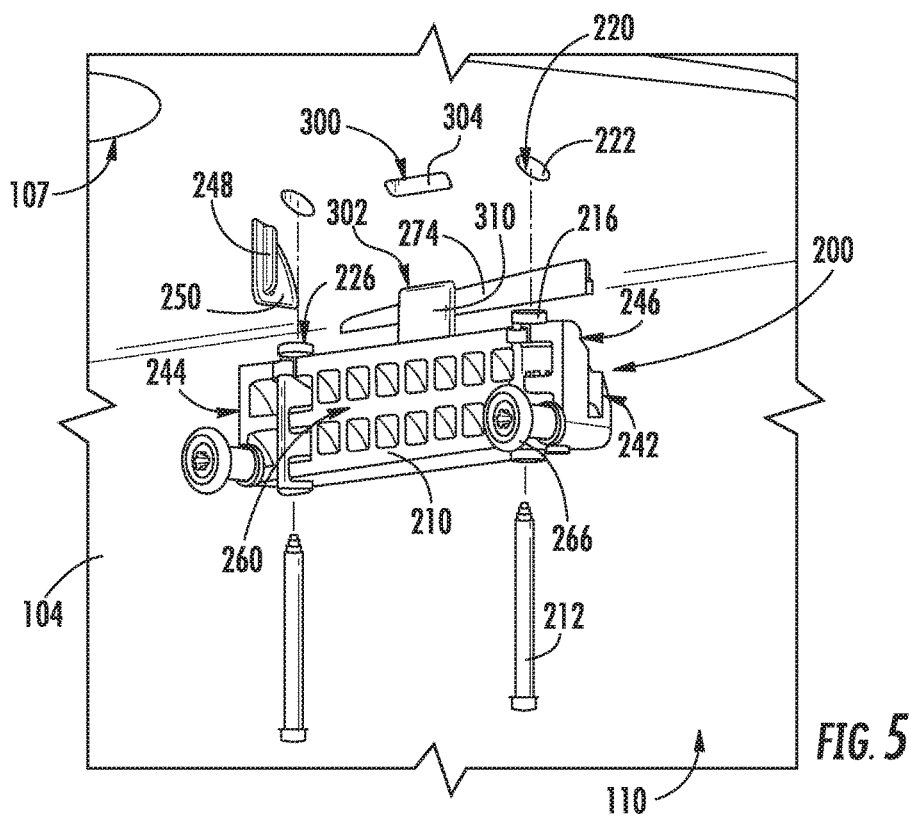
FIG. 5 provides an exploded perspective view of the exemplary rack mounting assembly of FIG. 4.

Referring now to FIGS. 4 and 5, rack mounting assembly 200 will be generally described according to an exemplary embodiment. As illustrated, rack mounting assembly 200 generally includes a mounting body 210 that is mounted to tub 104 using one or more mechanical fasteners 212, such as screws, bolts, rivets, etc. Alternatively, glue, welding, snap-fit mechanisms, interference-fit mechanisms, or any suitable combination thereof may secure mounting body 210 to tub 104. Although mounting body 210 is illustrated herein as being mounted proximate the right side wall 110, it should be appreciated that mounting body 210 may also be mounted on the left side wall 110 (see FIG. 3). For example, as illustrated, mounting body 210 is symmetric such that it may be used for both the left side and right side rack mounting assemblies 200.

According to the illustrated embodiment, mounting body 210 defines a clearance hole or mounting hole 214 (see FIG. 11) and a mounting boss 216 that are configured to receive screws 212. More specifically, mounting boss 216 is coaxial with mounting hole 214 and both define a diameter substantially equivalent to the diameter of screws 212. However, it should be appreciated that according to alternative embodiments, mounting boss 216 may be omitted and mounting body 210 alone can define mounting holes 214. According to the illustrated embodiment, screws 212 extend substantially along the vertical direction V to mount mounting body 210 within radiused corner 202 of tub 104. However, it should be appreciated that according to alternative embodiments, mounting body 210 could be mounted by screws extending in a different direction or directions, e.g., along a horizontal direction into side wall 110. Alternatively, screws 212 could be received directly in top wall 107 instead of in radiused corner 202. Moreover, although two mounting screws 212 are illustrated, it should be appreciated that one or more than two screws may be used according to alternative embodiments.

Figure 8:
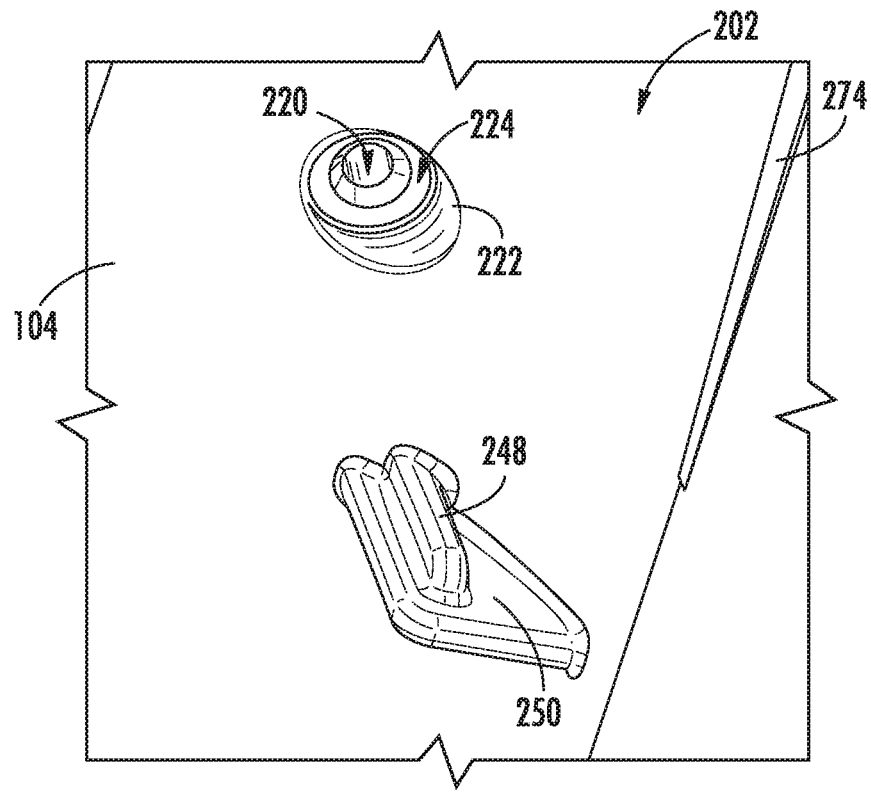
FIG. 8 provides a close-up, perspective view of a vertical rib and a screw hole defined on the tub of the exemplary dishwashing appliance of FIG. 1 according to an exemplary embodiment of the present subject matter.
Figure 9:
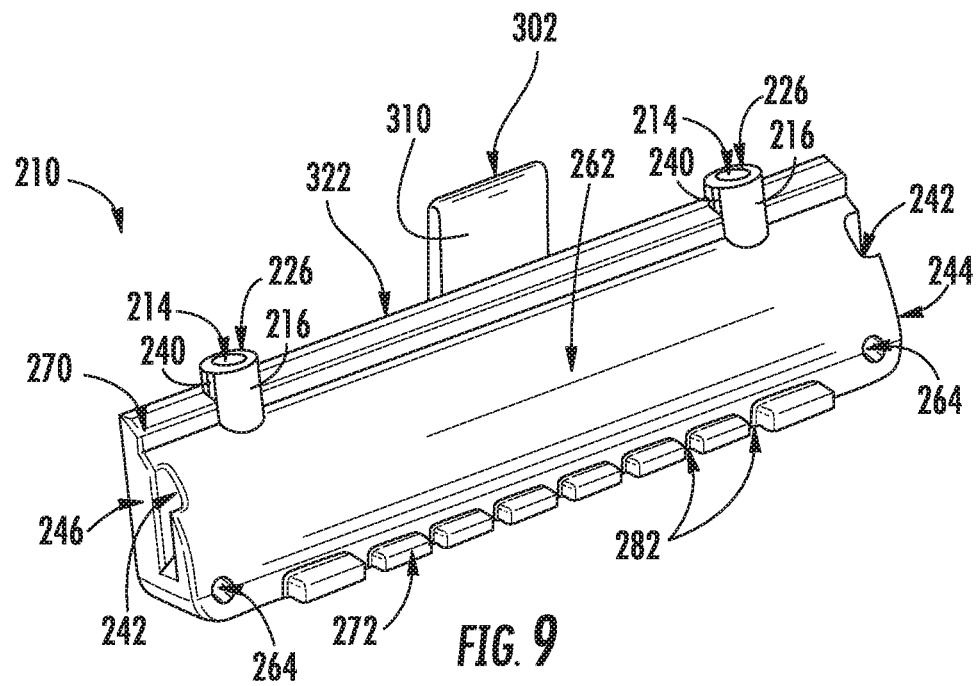
FIG. 9 provides a rear perspective view of a mounting body of the exemplary rack mounting assembly of FIG. 4 according to an example embodiment of the present subject matter.
Figure 10:
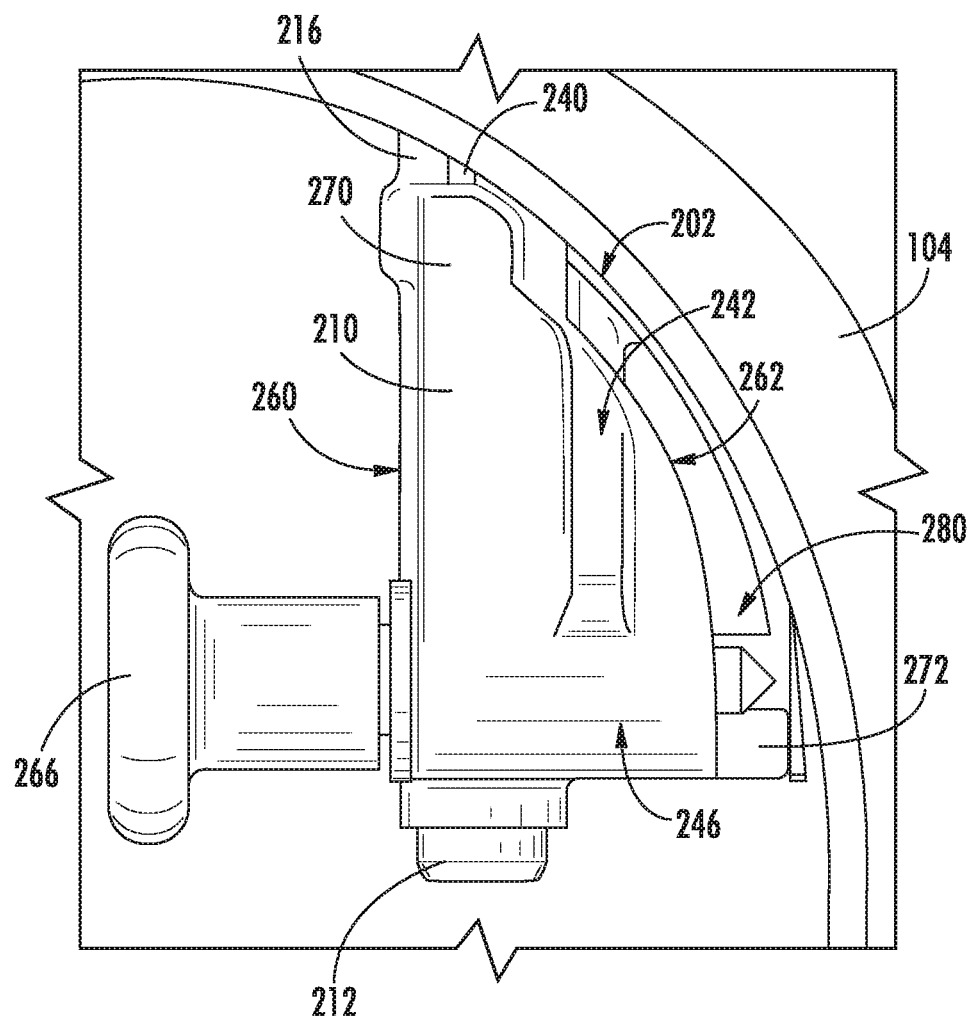
FIG. 10 provides a close-up, front view of the exemplary rack mounting assembly of FIG. 4.
Figure 11:
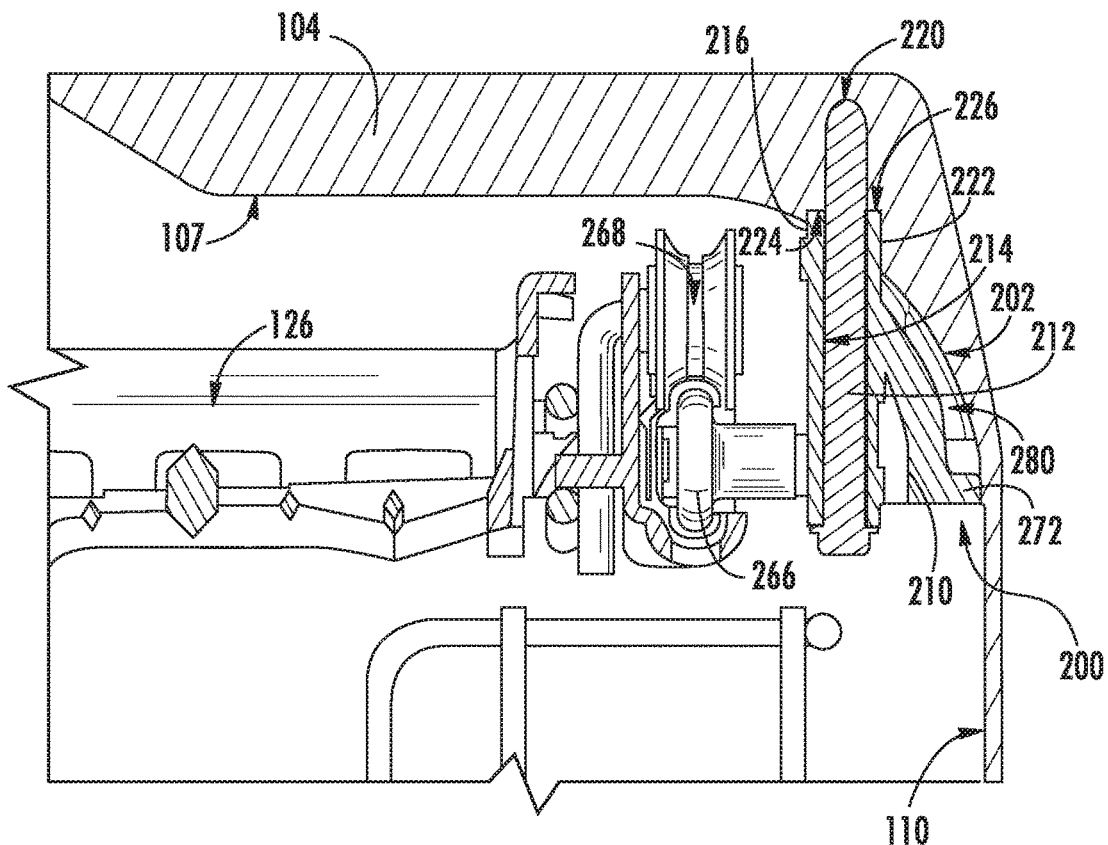
FIG. 11 provides a front cross-sectional view of the exemplary rack mounting assembly of FIG. 4, taken through a mounting screw of the exemplary rack mounting assembly.

Tub 104 defines various features for receiving mounting body 210, as will be described herein according to an exemplary embodiment. For example, as illustrated in FIG. 8, tub 104 defines one or more screw holes 220 that are generally configured for receiving screws 212 to secure mounting body 210 to tub 104. Thus, screws 212 pass through mounting holes 214 and mounting bosses 216 of mounting body 210 and into screw holes 220 to secure mounting body 210 to tub 104. According to the illustrated embodiment, screw holes 220 are defined in radiused corner 202 of tub 104. In order to ensure mounting body 210 is securely received within screw hole 220 and maintains its upright position, i.e., such that mounting hole 214 extends along the vertical direction V, screw hole 220 includes a counterbore 222. Counterbore 222 terminates in or defines a flat shoulder 224 that is configured for engaging a flat top 226 of mounting boss 216. In this manner, mounting boss 216 is securely mounted to tub 104.

Figure 12:
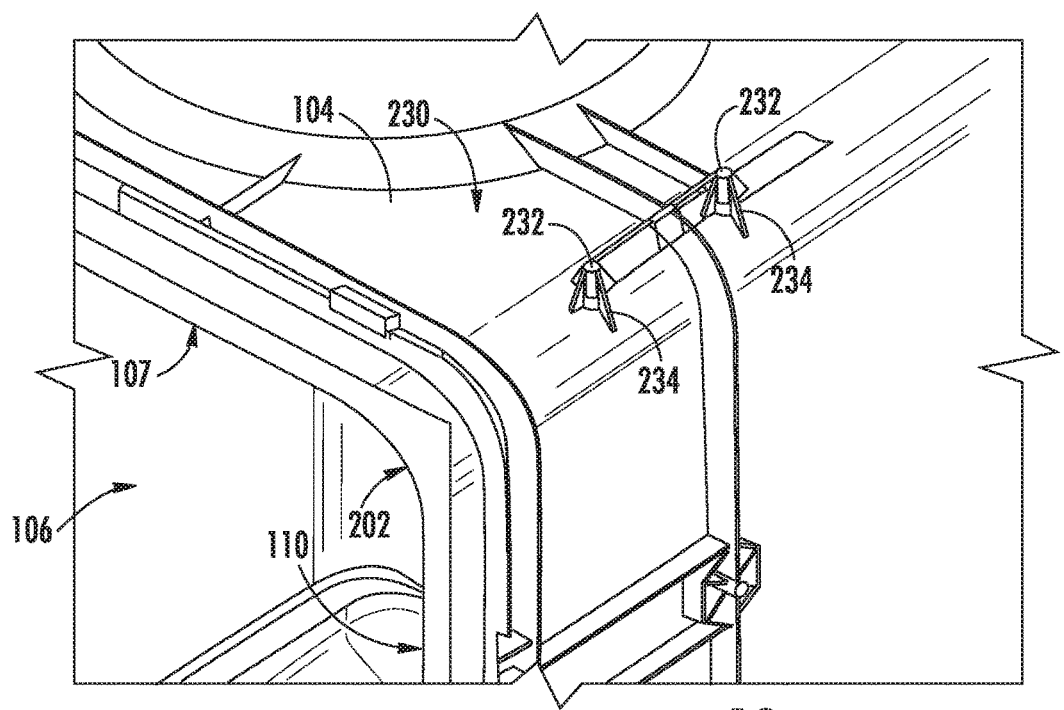
FIG. 12 provides a perspective view of an outer surface of the tub of the exemplary dishwashing appliance of FIG. 1.
Figure 13:
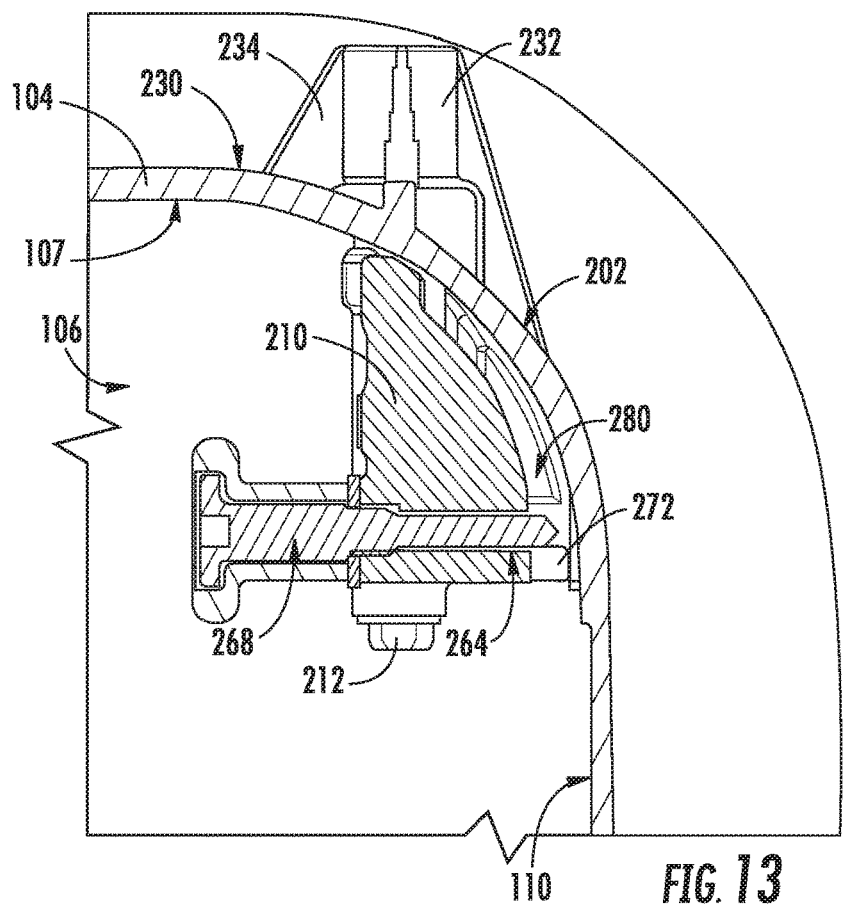
FIG. 13 provides a front cross-sectional view of the exemplary rack mounting assembly of FIG. 4, taken through a roller assembly of the exemplary rack mounting assembly.
Figure 14:
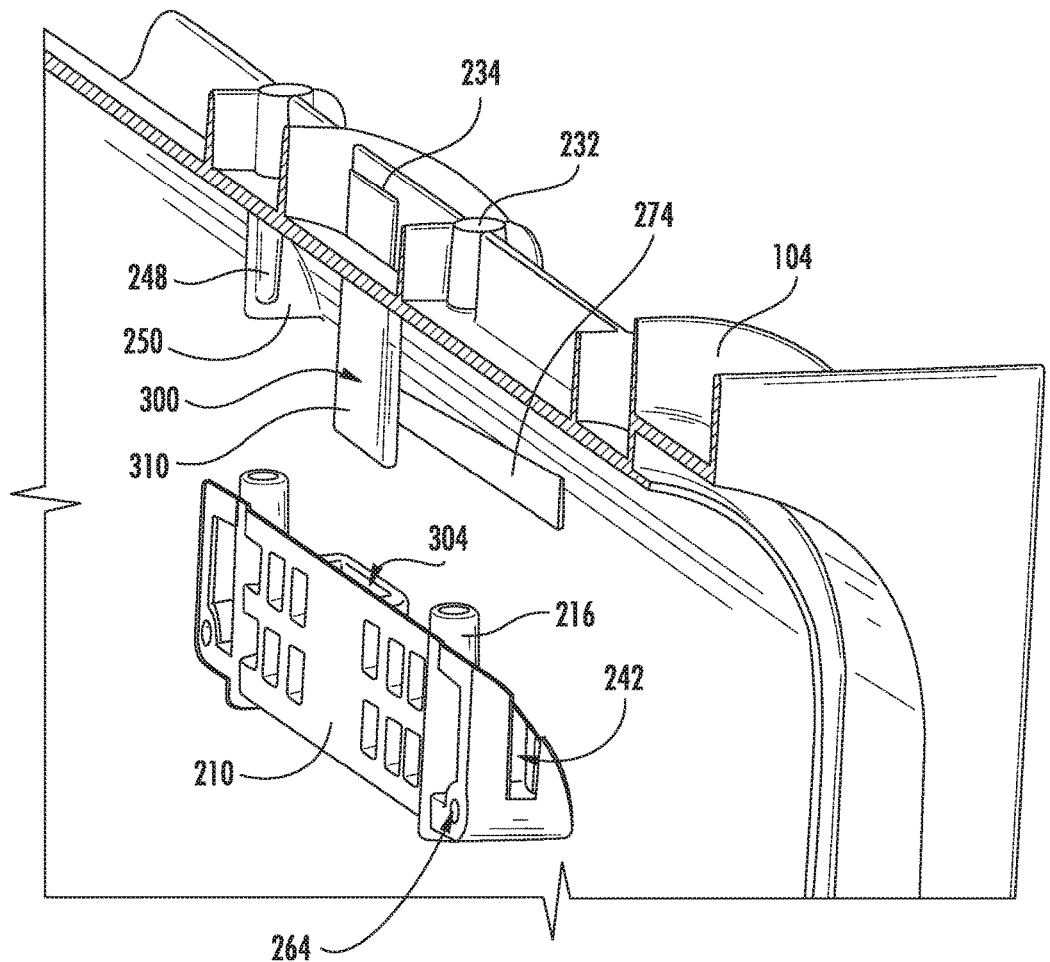
FIG. 14 provides an exploded perspective view of a rack mounting assembly within a tub of a dishwasher appliance according to another embodiment of the present subject matter.
Figure 15:
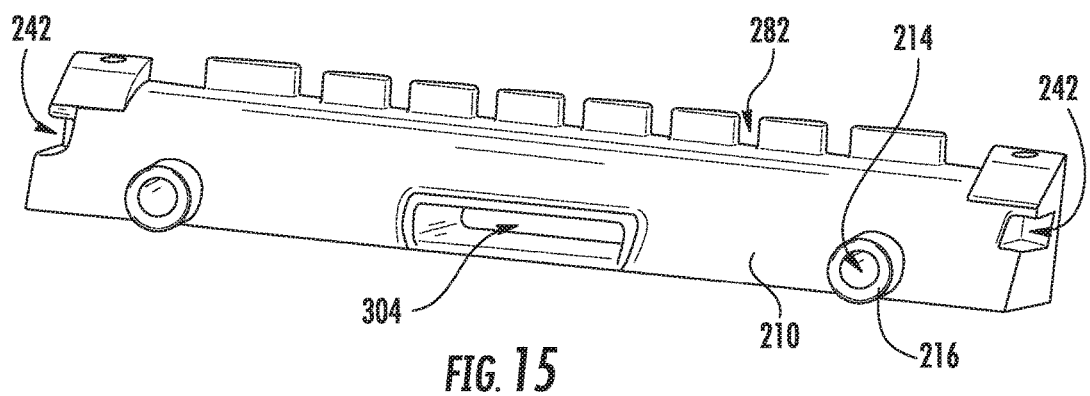
FIG. 15 provides a perspective view of a mounting body of the exemplary rack mounting assembly of FIG. 14.

Moreover, as illustrated in FIGS. 8 and 11 through 13, screw hole 220 does not extend all the way through tub 104 such that no leak points are introduced. More specifically, as shown in FIGS. 12 and 13, an outer surface 230 of tub 104 may define a tub boss 232 and support ribs 234 that provide a structurally rigid portion of tub 104 that defines screw hole 220. Thus screws 212 penetrate or puncture only a portion of the thickness of tub 104 such that no holes are defined through tub 104. To simplify the installation and mounting of mounting body 210, mounting boss 216 may further include one or more protruding ribs 240 (see FIG. 9) that extend radially outward from mounting boss 216 and are configured for engaging screw hole 220 to temporarily hold mounting body 210 in place while screw 212 is inserted. For example, protruding ribs 240 may be crush ribs designed to deflect as mounting bosses 216 are urged into counterbores 222 or may generally be large enough to form an interference fit with screw holes 220.

Referring now to FIGS. 4 through 10, rack mounting assembly 200 may further include features to ensure proper alignment and simplify installation of mounting body 210 within tub 104. For example, mounting body 210 defines a vertical slot 242 on a back end 244 of mounting body 210 (and on a front end 246 if mounting body 210 is symmetrical). In addition, tub 104 defines a vertical rib 248 that extends along the vertical direction V to engage vertical slot 242 when mounting body 210 is in an installed position. In addition, a lateral support structure 250 extends within a plane perpendicular to the transverse direction T and is joined with tub 104, e.g., proximate radiused corner 202 to prevent vertical rib 248 from flexing and ensuring proper alignment of mounting body 210 along the transverse direction T.

According to the illustrated embodiment, mounting body 210 defines a first side 260 that faces toward the interior of wash chamber 106 and extends substantially within a plane defined perpendicular to the lateral direction L. In addition, mounting body 210 defines a second side 262 that faces toward tub 104, e.g., toward radiused corner 202 and is curved to substantially match the contour of radiused corner 202. As best illustrated in FIGS. 4, 5, and 13, mounting body 210 may define a plurality of roller holes 264 extending through first side 260 along the lateral direction L and being configured to receive rollers 266 for a slide assembly 268 for upper rack assembly 126. Although rollers 256 are illustrated as supporting upper rack assembly 126, it should be appreciated that rack mounting assembly 200 may alternatively include any suitable rack support mechanism for supporting any size or type of rack.

Referring now generally to FIGS. 9 through 13, rack mounting assembly 200 includes additional features to ensure proper alignment of mounting body 210 within tub 104. For example, mounting body 210 may generally define a vertical standoff 270 positioned on a top side of mounting body 210 and extending along the transverse direction T, e.g., to support mounting bosses 216 and provide some separation between mounting body 210 and tub 104. In addition, mounting body 210 may generally define a lateral standoff 272 positioned on second side 262 of mounting body 210. In general, lateral standoff 272 is positioned between mounting body 210 and side wall 110 and extends along the transverse direction T.

In addition, side wall 110 of tub 104 defines a tapered leveling surface 274 configured for engaging lateral standoff 272 along a line parallel to the transverse direction T. In this regard, tapered leveling surface 274 gets thicker as it extends from rear wall 112 toward front 111 to compensate for the draft (or slight angle) of side wall 110 and to define a substantially straight support surface extending along the transverse direction T. As illustrated, when mounting body 210 is in the installed position such that lateral standoff 272 engages tapered leveling surface 274, first side 260 of mounting body 210 extends substantially along the transverse direction T to facilitate proper operating of slide assembly 268.

In addition, lateral standoff 272 is positioned such that a gap 280 is defined between tub 104 and mounting body 210, or more particularly, between radiused corner 202 and curved second side 262 of mounting body 210. In addition, lateral standoff 272 may be notched or may define a plurality of drain apertures 282 (see FIG. 9). Drain apertures 282 are spaced apart along the transverse direction T and allow for any wash fluid or soil to drain from gap 280. Similarly, although not illustrated, vertical standoff 270 may include similar apertures according to alternative embodiments.

Referring now specifically to FIGS. 4 through 7, 9, and 14-16, tub 104 and mounting body 210 may define various additional features for ensuring proper alignment of mounting body 210 before screws 212 are able to engage tub 104. For example, tub 104 may define one or more alignment features 300. In addition, rack assembly 200 may include one or more complementary features 302, which may be, for example, defined by or in mounting body 210. Notably, alignment features 300 and complementary features 302 are designed such that when complementary features 302 engage alignment features 300 of tub 104 (or vice/versa), mounting boss 216 is substantially aligned with screw hole 220. Thus, in this manner, an operator may position mounting body 210 in its proper position in tub 104 prior to driving any screws 212. This prevents the inadvertent puncturing of tub 104, e.g., by driving screws when mounting body 210 is improperly positioned, thereby reducing the risk of leaks in tub 104 and simplifying assembly.

Notably, as used herein, "alignment features" may be used generally to refer to any feature defined by, mounted to, or extending from tub 104 for use in aligning mounting body 210. For example, alignment features may be one or more of a protruding part or member, a recessed slot or cavity, a bump, a dimple, a keyed surface feature, or any other suitable feature configured for receiving or being received within a "complementary feature." Thus, similarly in this regard, "complementary features" may be used generally to refer to any feature defined by, mounted to, or extending from mounting body 210 for engaging, receiving, or being received within the corresponding "alignment feature." For example, complementary features may be one or more of a protruding part or member, a recessed slot or cavity, a bump, a dimple, a keyed surface feature, or any other suitable feature. Although the discussion herein illustrates exemplary alignment features and complementary features, it should be appreciated that these are only exemplary and are not intended to limit the scope of the present subject matter in any manner.

For example, referring specifically to FIGS. 4 through 7 and 9, alignment feature 300 includes an elongated recess 304 defined in tub 104 and complementary feature 302 includes a protruding member extending from mounting body 210 of rack mounting assembly 200. More specifically, the protruding member is an elongated tab 310 according to the illustrated embodiment. As illustrated, elongated tab 310 extends from mounting body 210 substantially along the vertical direction V and is configured for receipt in elongated recess 304. Although complementary feature 302 is illustrated as a single elongated tab 310 extending in a plane perpendicular to the lateral direction L, it should be appreciated that any suitable number, size, shape, spacing, and orientation of elongated tabs 310 may be used according to alternative embodiments. For example, referring briefly to FIGS. 14 and 15, according to another embodiment, alignment feature 300 (instead of complementary feature 302) could include elongated tabs, e.g., extending downward from tub 104, and complementary feature 302 could be an elongated recess 304 defined within mounting body 210.

Alignment features 300 and complementary features 302 may be sized, shaped, and positioned in any suitable manner for achieving the desired interaction between tub 104 and mounting body 210. For example, as best shown in the exemplary embodiment of FIG. 6, complementary feature 302 (i.e., elongated tab 310) is centered along a length 312 of mounting body 210. However, according to alternative embodiments, complementary feature 302 is positioned off-center along length 312 of mounting body 210. Notably, an off-center complementary feature 302 will assist in preventing an operator from installing mounting body 210 in the wrong direction, e.g., such that first side 260 is facing away from upper rack assembly 126. In addition, according to one exemplary embodiment, alignment feature 300, e.g., elongated recess 304 is defined in radiused corner 202, such that mounting body 210 may be installed in radiused corner 202.

Figure 6:
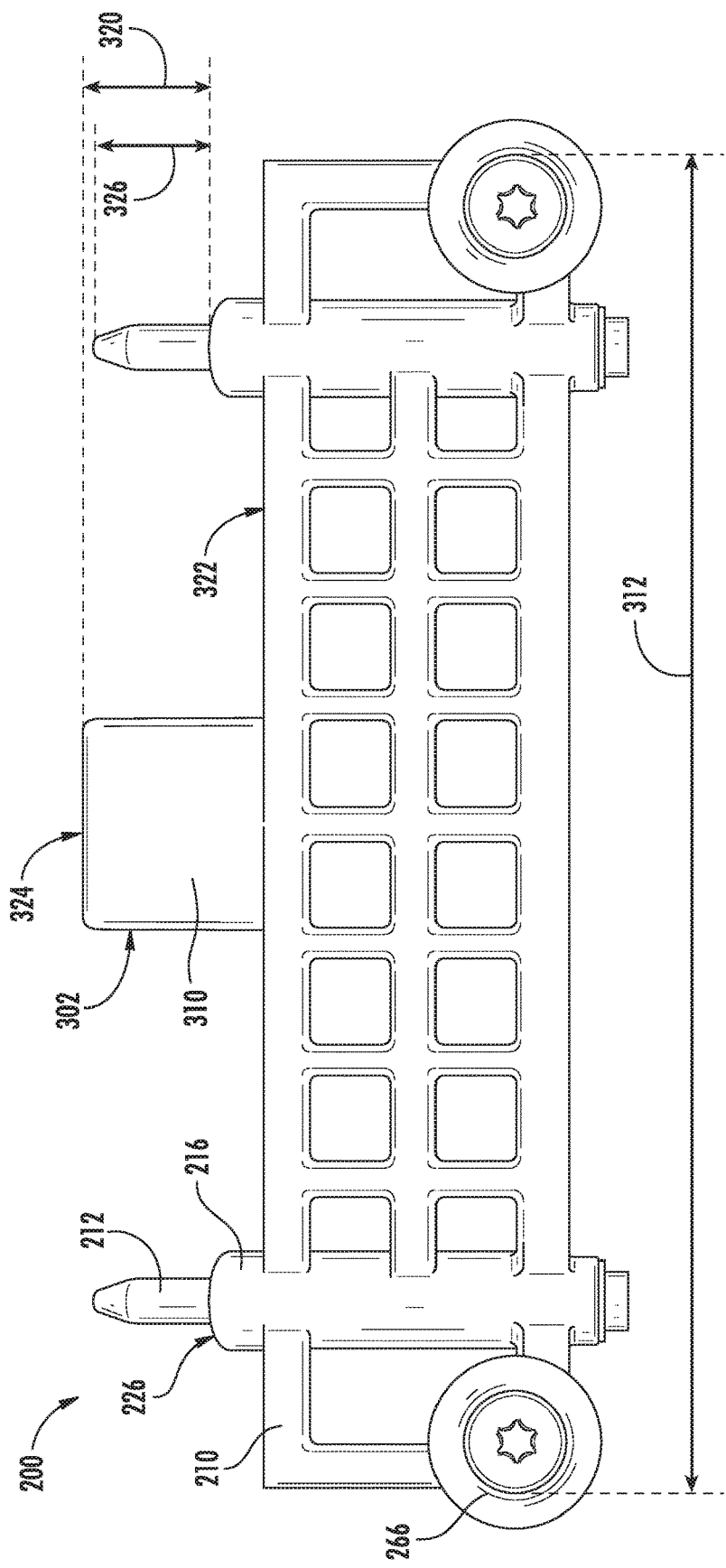
FIG. 6 provides a front view of the exemplary rack mounting assembly of FIG. 4.
Figure 7:
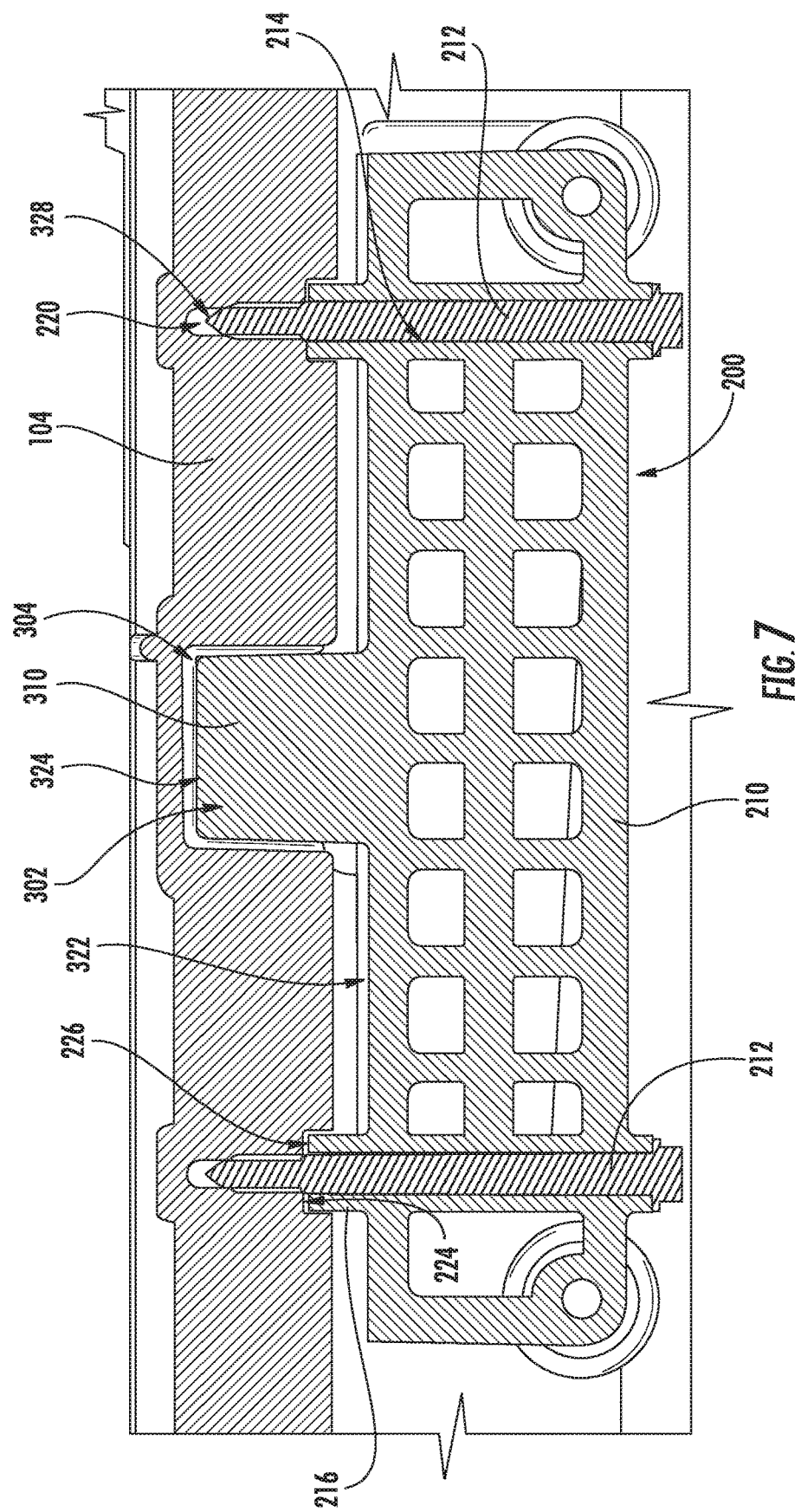
FIG. 7 provides a cross sectional view of the exemplary rack mounting assembly of FIG. 4 mounted to a tub of the exemplary dishwashing appliance of FIG. 1.

Referring still to FIG. 6, elongated tab 210 (or another protruding alignment feature 300 or complementary feature 302) defines a protrusion height 320 measured between a top 322 of mounting body 210 and a distal end 324 of elongated tab 310 along the vertical direction V. In addition, screw 212 defines a screw height 326 when fulling inserted into mounting boss 216. More specifically, screw height 326 is defined as the length of screw 212 that extends through mounting body 210 (i.e., the threaded portion of screw 212 opposite the screw head). In other words, for example, screw height 326 is measured between top 322 of mounting body 210 and a tip 328 of screw 212. According to an exemplary embodiment, the screw height 326 is less than or equal to the protrusion height 320. In this manner, screws 212 cannot engage tub 104 unless elongated tab 310 is inserted into elongated recess 304, i.e., when mounting body 210 is properly aligned.

Figure 16:
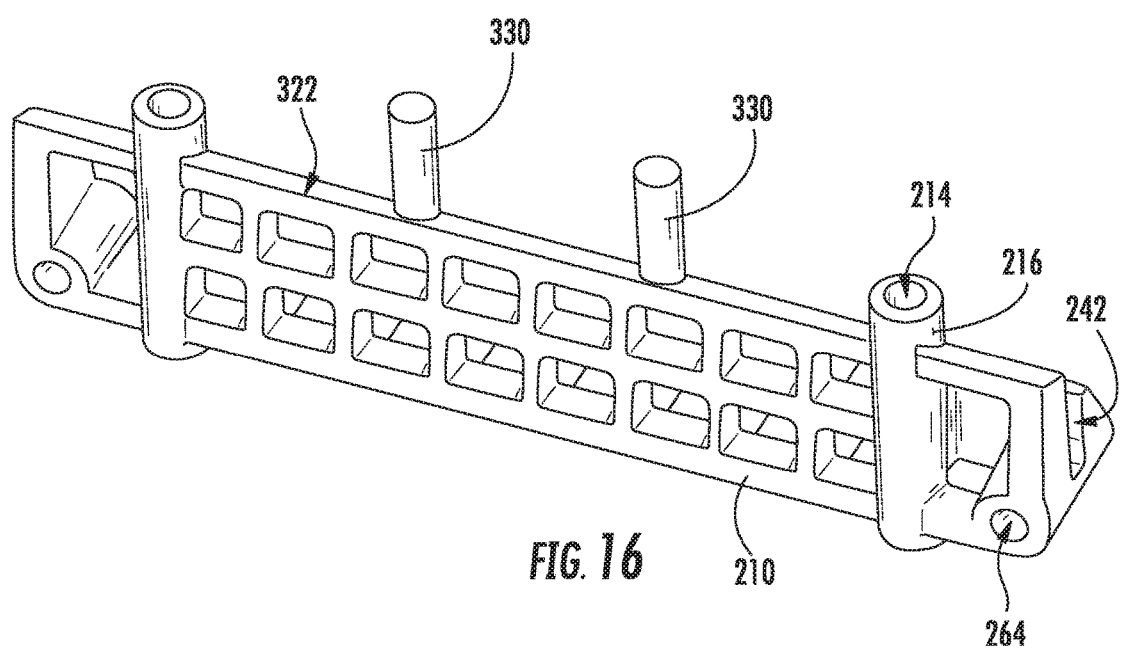
FIG. 16 provides a perspective view of a mounting body of a rack mounting assembly according to another exemplary embodiment of the present subject matter.

Referring now to FIG. 16, an alternative exemplary embodiment of mounting body 210 will be described. Due to the similarity between embodiments, like reference numerals may be used to refer to the same or similar features in FIG. 16. As illustrated, complementary features 302 include two elongated posts 330. More specifically, elongated posts 330 are spaced apart along length 312 of mounting body 210 and extend substantially along the vertical direction V. Elongated posts 330 may be configured for receipt in alignment features 300 of tub 104 (e.g., cylindrical recesses, not shown, that are defined at the same spacing and having a substantially similar height). Although complementary features 302 are illustrated in FIG. 16 as two elongated posts 330, it should be appreciated that one or more than two posts having any suitable size, shape, spacing, and orientation may be used according to alternative embodiments. For example, according to another embodiment, alignment features 300 could define elongated posts, e.g., extending downward from tub 104, and complementary features 302 could be cylindrical recesses defined within mounting body 210.

It should be appreciated that rack mounting assembly 200 is described herein only for the purpose of explaining aspects of the present subject matter. Modifications and variations may be made to rack mounting assembly 200 while remaining within the scope of the present subject matter. For example, the size, configuration, position, and operation of mounting body 210 and the various features of tub 104 such as alignment features 300 and complimentary features 302 may vary or be adjusted to control the interaction between mounting body 210 and tub 104 while remaining within the scope of the present subject matter. Rack mounting assembly 200 as described above provides a simple and effective mechanism for installing upper rack assembly 126 or any other suitable rack assembly within dishwasher appliance 100 in a leak-free and reliable manner. Other configurations and benefits will be apparent to those of skill in the art.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A dishwasher appliance defining a vertical, a lateral, and a transverse direction, the dishwasher appliance comprising:
    a tub comprising a top wall and a side wall joined by a radiused corner, the top wall and the side wall partially defining a wash chamber for receipt of articles for washing, the tub further defining an alignment feature defined in the radiused corner of the tub and a screw hole that only penetrates through a portion of the tub so that no holes are defined through the tub;
    an upper rack assembly slidably positioned within the wash chamber and configured for movement along the transverse direction; and
    a rack mounting assembly for supporting the upper rack assembly, the rack mounting assembly comprising:
        a mounting body defining a mounting hole;
        a complementary feature configured for engaging the alignment feature of the tub, the mounting hole being substantially aligned with the screw hole when the complementary feature engages the alignment feature of the tub; and
        a screw passing through the mounting hole and into the screw hole to secure the mounting body to the tub.

2. The dishwasher appliance of claim 1, wherein the alignment feature is a recess defined in the tub and the complementary feature is a protruding member extending from the mounting body of the rack mounting assembly.

3. The dishwasher appliance of claim 1, wherein the complementary feature is an elongated tab protruding from the mounting body.

4. The dishwasher appliance of claim 1, wherein the complementary feature is one or more posts protruding from the mounting body.

5. The dishwasher appliance of claim 1, wherein the alignment feature is a protruding member that extends from the tub into the wash chamber and the complementary feature is a complementary recess defined in the mounting body of the rack mounting assembly.

6. The dishwasher appliance of claim 1, wherein the alignment feature is an elongated tab protruding from the tub into the wash chamber.

7. The dishwasher appliance of claim 1, wherein the alignment feature is one or more posts protruding from the tub into the wash chamber.

8. The dishwasher appliance of claim 1, wherein the complementary feature is positioned off-center along a length of the mounting body.

9. The dishwasher appliance of claim 1, wherein one of the alignment feature and the complementary feature is a protruding member, the protruding member defining a protrusion height, and wherein the screw extends through the mounting body by a screw height when fully inserted into the mounting hole, the screw height being less than or equal to the protrusion height.

10. The dishwasher appliance of claim 1, wherein the tub defines a plurality of screw holes, the mounting body defines a plurality mounting holes, and a plurality of screws are used to secure the mounting body to the tub.

11. The dishwasher appliance of claim 1, wherein the dishwasher appliance comprises a first rack mounting assembly positioned proximate a first side wall of the dishwasher appliance and a second rack mounting assembly positioned proximate a second side wall of the dishwasher appliance, and wherein the mounting body is symmetric such that it may be used in both the first rack mounting assembly and the second rack mounting assembly.

12. The dishwasher appliance of claim 1, wherein the tub is injection-molded using a plastic material.

13. A rack mounting assembly for supporting an upper rack assembly within a tub of a dishwasher appliance, the tub comprising a top wall and a side wall joined by a radiused corner and partially defining a wash chamber for receipt of articles for washing, the tub further defining an alignment feature defined within the radiused corner and a screw hole that only penetrates through a portion of the tub so that no holes are defined through the tub, the rack mounting assembly comprising:
    a mounting body defining a mounting hole;
    a complementary feature configured for engaging the alignment feature of the tub, the mounting hole being substantially aligned with the screw hole when the complementary feature engages the alignment feature of the tub; and a screw passing through the mounting hole and into the screw hole to secure the mounting body to the tub.

14. The rack mounting assembly of claim 13, wherein the alignment feature is a recess defined in the tub and the complementary feature is a protruding member extending from the mounting body of the rack mounting assembly.

15. The rack mounting assembly of claim 13, wherein the complementary feature is an elongated tab or one or more posts protruding from the mounting body.

16. The rack mounting assembly of claim 13, wherein the alignment feature is a protruding member that extends from the tub into the wash chamber and the complementary feature is a complementary recess defined in the mounting body of the rack mounting assembly.

17. The rack mounting assembly of claim 13, wherein the alignment feature is an elongated tab or one or more posts protruding from the tub into the wash chamber.

18. The rack mounting assembly of claim 13, wherein the complementary feature is positioned off-center along a length of the mounting body.

19. The rack mounting assembly of claim 13, wherein one of the alignment feature and the complementary feature is a protruding member, the protruding member defining a protrusion height, and wherein the screw extends through the mounting body by a screw height when fully inserted into the mounting hole, the screw height being less than or equal to the protrusion height.

\* \* \* \* \*